(12) United States Patent
Okase et al.

(10) Patent No.: US 8,434,522 B2
(45) Date of Patent: May 7, 2013

(54) FLUID CONTROL APPARATUS

(75) Inventors: Wataru Okase, Tokyo (JP); Shuji Moriya, Tokyo (JP); Tomohiro Nakata, Osaka (JP); Tsutomu Shinohara, Osaka (JP); Michio Yamaji, Osaka (JP)

(73) Assignees: Tokyo Electron Limited, Tokyo (JP); Fujikin Incorporated, Osaka-shi (JP)

( * ) Notice: Subject to any disclaimer, the term of this patent is extended or adjusted under 35 U.S.C. 154(b) by 548 days.

(21) Appl. No.: 12/451,649

(22) PCT Filed: May 26, 2008

(86) PCT No.: PCT/JP2008/059628
§ 371 (c)(1),
(2), (4) Date: Nov. 23, 2009

(87) PCT Pub. No.: WO2008/149702
PCT Pub. Date: Dec. 11, 2008

(65) Prior Publication Data
US 2010/0096031 A1  Apr. 22, 2010

(30) Foreign Application Priority Data

May 31, 2007 (JP) ................................. 2007-144918

(51) Int. Cl.
*F16K 11/10* (2006.01)
(52) U.S. Cl.
USPC ....................................................... 137/884
(58) Field of Classification Search .................. 137/269, 137/271, 597
See application file for complete search history.

(56) References Cited

U.S. PATENT DOCUMENTS

| 5,819,782 | A | * | 10/1998 | Itafuji | 137/240 |
| 6,035,893 | A | * | 3/2000 | Ohmi et al. | 137/597 |
| 6,116,283 | A | * | 9/2000 | Yamaji et al. | |
| 6,152,175 | A | * | 11/2000 | Itoh et al. | 137/602 |
| 6,257,270 | B1 | * | 7/2001 | Ohmi et al. | 137/240 |
| 6,450,200 | B1 | * | 9/2002 | Ollivier | 137/624.12 |
| 6,712,400 | B1 | * | 3/2004 | Yamaji et al. | 285/284.1 |

FOREIGN PATENT DOCUMENTS

| JP | 08-227836 A | 9/1996 |
| JP | 08-326943 A | 12/1996 |
| JP | 10-148272 A | 6/1998 |
| JP | 10-220698 A | 8/1998 |
| JP | 10-227368 A | 8/1998 |
| JP | 11-351500 A | 12/1999 |
| WO | WO-2006/115084 A1 | 11/2006 |
| WO | WO-2008/062679 A1 | 5/2008 |

OTHER PUBLICATIONS

International Search Report mailed Aug. 12, 2008, issued on PCT/JP2008/059628.

* cited by examiner

*Primary Examiner* — John Fox
(74) *Attorney, Agent, or Firm* — Oblon, Spivak, McClelland, Maier & Neustadt, L.L.P.

(57) ABSTRACT

There is provided a fluid control apparatus which can reduce the number of members and can improve the assembling operation efficiency.
A pressure indication device 4 to be replaced with a relatively-higher frequency is coupled to a base block 5 existing thereunder through male screw members 17 from above. An on-off valve 6 to be replaced with a relatively-lower frequency has, at its lower portion, a block-shaped main body 6a formed integrally therewith. The main body 6a of the on-off valve 6 is coupled to the base block 5 through male screw members 18 in the forward and rearward directions.

1 Claim, 3 Drawing Sheets

FLUID CONTROL APPARATUS

TECHNICAL FIELD

The present invention relates to a fluid control apparatus for use in a semiconductor manufacturing apparatus and the like and, more particularly, relates to a fluid control apparatus formed by integrating plural fluid control devices.

BACKGROUND ART

In fluid control apparatuses for use in semiconductor manufacturing apparatuses, there has been advanced integration for placing plural fluid control devices in series and connecting them to one another without interposing pipes and joints thereamong for installing plural lines in parallel with one another on a base member. Patent Document 1 discloses, as such a fluid control apparatus, one which includes plural block-shaped joint members forming a lower layer which are mounted to a base member through male screw members and, further, including plural fluid control devices forming an upper layer which are mounted thereto such that they straddle adjacent joint members.

Patent Document 1: Japanese Unexamined Patent Publication No. 10-227368

SUMMARY OF THE INVENTION

Problems to be Solved by the Invention

The fluid control apparatus in the Patent Document 1 has the advantage that the space occupied by the apparatus is reduced and, further, the volumes of the flow channels are reduced, but includes a great number of members, thereby inducing the problem of the necessity of burdensome processes for positioning the fluid control devices for mounting them such that they straddle adjacent joint members. Therefore, there has been a need for further improvement thereof.

It is an object of the present invention to provide a fluid control apparatus which can reduce the number of members and can improve the assembling operation efficiency.

Means for Solving the Problems

According to the present invention, there is provided a fluid control apparatus including plural types of fluid control devices, base blocks for supporting the fluid control devices, and sealing means for ensuring sealing properties at the portions where fluid flow channels are butted with one another, wherein at least one of the plural types of fluid control devices is a fluid control device provided with a base block which includes a connection block portion provided with a flow channel opened at the lower surface and also is coupled to one or more base blocks placed thereunder through male screw members from above, the other fluid control devices, out of the plural types of fluid control devices, are fluid control devices provided with no base block which are closed at the lower surfaces of their main bodies and also are provided with no base blocks placed thereunder, and the fluid control device provided with the base block is coupled, at the base block placed thereunder, to the main bodies of the fluid control devices provided with no base block, through male screw members in the forward and rearward directions, such that their lower surfaces are flushed with each other.

In the present specification, the terms "upper" and "lower" mean the upper and lower portions in FIG. 1 and FIG. 3, and the terms "the forward and rearward directions" mean the leftward and rightward directions in FIG. 1 and FIG. 3, but these terms "upper", "lower", "forward" and "rearward" are merely for convenience. The fluid control apparatus may be mounted on a horizontal surface in the state of the upward and downward directions in FIG. 1 and FIG. 3 and, also, may be mounted on a horizontal surface in an upside-down state or on a vertical surface.

The plural types of fluid control devices are sorted into fluid control devices provided with base blocks and fluid control devices provided with no base block. A fluid control device provided with a base block is adapted such that its main body can be separated from the base block, and the fluid control device can be treated as a single member in a state where the base block is not mounted thereto and, also, can be treated as an assembled member provided with the base block. A fluid control device provided with no base block has no base block and, therefore, is usually treated as a fluid control device itself. Accordingly, in a state where the fluid control devices provided with the base blocks are coupled, at the base blocks existing at the lower portion, to the main bodies of fluid control devices provided with no base block through male screw members in the forward and rearward directions, the fluid control devices, out of the fluid control devices provided with the base blocks, can be extracted upwardly and individually, while the fluid control devices provided with no base block can not be extracted upwardly and individually.

In a case where the plural types of fluid control devices are all formed from fluid control devices provided with no base block, and they are coupled to one another through male screw members in the forward and rearward directions, this eliminates the necessity of providing male screw members from above, which is advantageous in terms of the assembling operation efficiency. However, since the plural types of fluid control devices include fluid control devices which are required to be frequently checked and replaced (those to be replaced with high frequencies), even when only a single fluid control device is detached, it is necessary to disassemble all of them by detaching the male screw members in the forward and rearward directions, which is disadvantageous in terms of maintenance. With the fluid control apparatus according to the present invention, the fluid control devices to be replaced with relatively-higher frequencies are formed from fluid control devices provided with base blocks, which can be upwardly and individually extracted, thereby improving the ease of maintenance thereof, and, further, the fluid control devices provided with the base blocks are coupled, at the base blocks, to the fluid control devices provided with no base block through male screw members in the forward and rearward directions, thereby ensuring the ease of assembling.

A fluid control device provided with a base block is constituted by a single fluid control device mounted to a single base block or is constituted by a single fluid control device mounted to two base blocks such that the fluid control device straddles the base blocks.

The main body of a fluid control device provided with no base block is at the same level as that of base blocks and, therefore, its main body can be constituted by a portion supporting its actuator portion and a protruding portion formed integrally therewith, such that the protruding portion can be used as a base block.

For example, on-off valves (valves only for closing and opening fluid channels), which are fluid control devices of one type, are relatively less prone to failures and, therefore, are not required to be subjected to maintenance frequently, out of the devices constituting the fluid control apparatus. On the other hand, pressure adjustment devices, filters, pressure indication devices and flow-rate adjustment devices are required to be checked and replaced with relatively-higher frequencies. Therefore, in the present invention, the various types of fluid control devices used in the fluid control apparatus are coupled to one another in two different manners in assembling them, in focusing attention to the replacement frequencies. Fluid control devices which are replaced with higher frequencies than that of on-off valves include pressure adjustment devices (or pressure reducing valves), pressure indication devices and flow-rate adjustment devices (or mass flow controllers).

The fluid control devices provided with the base blocks, that is the fluid control devices to be replaced with relatively higher frequencies, are coupled to the base blocks existing thereunder through the male screw members from above and, therefore, the fluid control devices can be individually and upwardly extracted, by detaching the male screw members. The fluid control devices provided with no base blocks, that is the fluid control devices to be replaced with relatively lower frequencies, are coupled, at their main bodies formed integrally therewith, to base blocks through male screw members in the forward and rearward directions and, therefore, they can not be detached therefrom without disassembling all of them by detaching the screws in the forward and rearward directions. As a result, the fluid control devices to be replaced with higher frequencies can be individually and upwardly extracted, thereby improving the ease of maintenance thereof, while base blocks as separate members are not used for the fluid control devices to be replaced with lower frequencies, thereby reducing the number of members and facilitating the assembling, even though the ease of maintenance thereof is relatively degraded. Therefore, with the entire fluid control apparatus, it is possible to attain both the ease of maintenance and the ease of assembling at higher levels than in the conventional art.

Further, in the above description, there have been exemplified pressure adjustment devices (or pressure reducing valves), pressure indication devices and flow-rate adjustment devices (or mass flow controllers), as fluid control devices which are replaced with higher frequencies than those of on-off valves. However, some of these fluid control devices can be formed to be fluid control devices provided with no base block and, also, predetermined on-off valves (for example, on-off valves placed at positions at which failures frequently occur, on-off valves placed at positions prone to corrosion), out of plural on-off valves, can be formed to be fluid control devices provided with base blocks, as a matter of course. Also, fluid control devices include flow-channel blocks provided with fluid flow channels therein, and these flow-channel blocks are treated as fluid control devices which are replaced with lower frequencies.

Each of the fluid control devices provided with the base block is mounted to only a single base block through male screw members, so that the fluid control device provided with the base block can be treated as a single member in the state where the base block is mounted thereto. With this configuration, it is possible to offer an advantage in terms of the assembling operation efficiency.

Further, at least one of the fluid control devices provided with no base block may be provided, at its main body, with a protruding block portion for supporting a portion of the adjacent fluid control device provided with the base block. With this configuration, it is possible to offer an advantage in terms of reduction of the number of members and the sealing portions.

The shapes of the fluid flow channels in the base blocks and the shapes of the fluid flow channels in the main bodies of the fluid control devices provided with no base block are changed as required, according to the shapes of the fluid flow channels in the adjacent base blocks and the shapes of the fluid flow channels in the main bodies of the adjacent fluid control devices provided with no base block. For example, the shapes of the fluid flow channels in the base blocks and the shapes of the fluid flow channels in the main bodies of the fluid control devices provided with no base block are formed to have an L shape and, also, the main bodies of the fluid control devices provided with no base block may be provided with a single V-shaped fluid flow channel and a single L-shaped fluid flow channel.

The main bodies of the fluid control devices provided with no base blocks, the base blocks and the connection block portions of the fluid control devices provided with base blocks are each constituted by a rectangular parallelepiped block provided with at least a single fluid flow channel therein and, hereinafter, they may be comprehensively referred to as "flow-channel blocks". When a "flow-channel block" is used solely, it functions as a base block. When a "flow-channel block" is provided integrally with a fluid control device provided with no base block, it functions as a main body. When a "flow-channel block" is provided integrally with a fluid control device provided with a base block, it functions as a connection block portion. The fluid flow channels in the base blocks and in the main bodies of the fluid control devices provided with no base block are opened upwardly, forwardly and rearwardly while being closed at the lower surfaces, while the connection block portions are opened upwardly and downwardly while being closed at their front and rear surfaces. A connection block portion and a base block which are integrated with each other correspond to the main body of a fluid control device provided with no base block and, such integration can reduce the number of required members.

The sealing means includes a gasket interposed between flow-channel blocks and annular gasket pressing protrusions formed on the butted surfaces of the respective flow-channel blocks and, also, is adapted such that the gasket is deformed by the annular gasket pressing protrusions, thereby ensuring sealing properties. The gasket pressing protrusions are provided to protrude outwardly in the axial direction, on reference surfaces of the flow-channel blocks (the bottom surfaces of concave portions formed in the butted surfaces). The concave portions are formed to protrude from the reference surfaces outwardly in the axial direction and come into intimate contact with the gasket, thereby contributing to the sealing. The gasket is preferably formed from stainless steel or nickel alloy or the like to have an annular shape (a circular disk shape with a hole).

The male screw members are preferably made of stainless steel (SUS304, SUS316 and the like), and the flow-channel blocks are also preferably made of stainless steel (SUS304, SUS316 and the like).

Effects of the Invention

With the fluid control apparatus according to the present invention, the fluid control devices to be replaced with relatively-higher frequencies are distinguished from the fluid control devices to be replaced with lower frequencies, and the fluid control devices to be replaced with higher frequencies are provided with base blocks so that they can be individually and upwardly extracted, while no base blocks are used as separate members for the fluid control devices to be replaced with lower frequencies. This can reduce the number of members and can facilitate assembling. Thus, with the entire fluid control apparatus, it is possible to attain the ease of maintenance and the ease of assembling at higher levels than in the conventional art.

Figure 1:
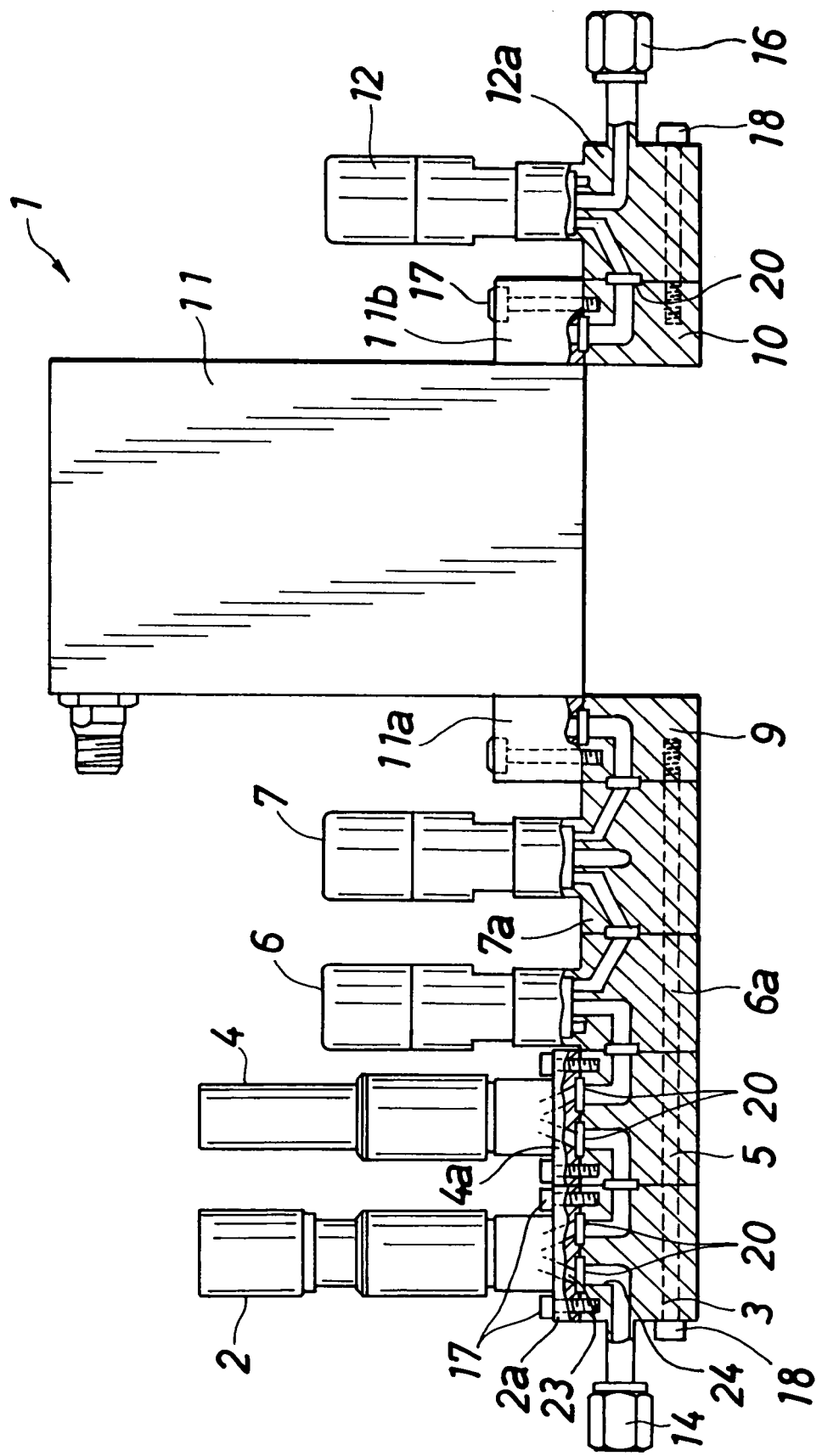
FIG. 1 is a vertical cross-sectional view showing a first embodiment of a fluid control apparatus according to the present invention.

DESCRIPTION OF REFERENCE CHARACTERS (1) Fluid control apparatus
(2) Pressure reducing valve (First fluid control device)
(3) (5) (9) (10) Base block
(4) Pressure indication device (Second fluid control device)
(6) (7) (12) On-off valve
(6a) (7a) (12a) Main body
(6b) (7b) (12b) Main body
(6c) (7c) (12c) Protruding block portion
(11) Flow-rate adjustment device (Third fluid control device)
(17) Male screw members from above
(18) Male screw members in the forward and rearward directions
(20) Sealing portion (sealing means)
(33) (34) Base block

PREFERRED EMBODIMENTS FOR CARRYING OUT THE INVENTION

Hereinafter, embodiments of the present invention will be described, with reference to the drawings.

Figure 2:
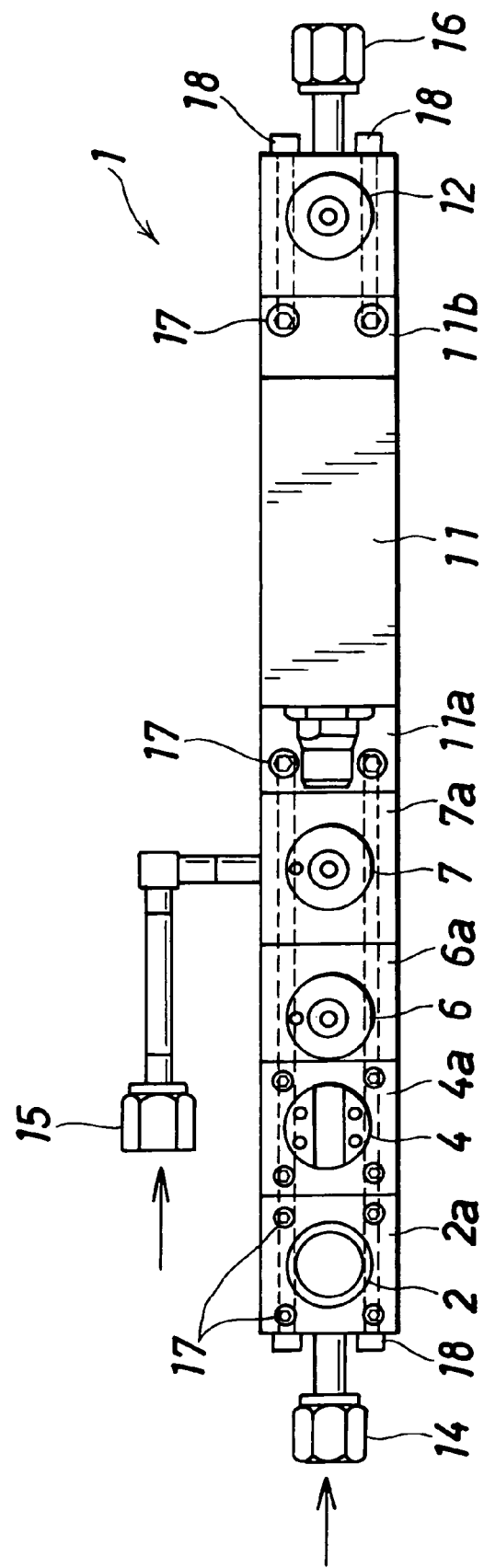
FIG. 2 is a plan view of the same.

FIG. 1 and FIG. 2 show a portion of a fluid control apparatus according to a first embodiment of the present invention.

The fluid control apparatus (1) is for use in a semiconductor manufacturing apparatus and the like and includes a pressure reducing valve (a first fluid control device) (2) having a connection block portion (2a) at its lower end, a first base block (3) which supports the pressure reducing valve (2), a pressure indication device (a second fluid control device) (4) which is placed adjacent to the outlet side (the right side in the figure) of the pressure reducing valve (2) and has a connection block portion (4a) at its lower end, a second base block (5) which supports the pressure indication device (4), a first on-off valve (6) which is placed adjacent to the outlet side of the pressure indication device (5) and also has, at its lower portion, a main body (6a) formed integrally therewith at the same level as that of the base blocks (3) (5), a second on-off valve (7) which is placed adjacent to the outlet side of the first on-off valve (6) and also has a main body (7a) formed integrally therewith at the same level as that of the main body (6a) of the first on-off valve (6), a third base block (9) placed adjacent to the outlet side of the main body (7a) of the second on-off valve (7), a fourth base block (10) placed oppositely to the outlet side of the third base block (9) with a predetermined interval interposed therebetween, a flow-rate adjustment device (a third fluid control device) (11) which has connection block portions (11a) (11b) at its inlet side and its outlet side and, also, is supported by the third base block (9) at its inlet-side connection block portion (11a) and is supported by the fourth base block (10) at its outlet-side connection block portion (11b), thereby being supported such that it straddles the third and fourth base blocks (9) (10), and a third on-off valve (12) which is placed adjacent to the outlet side of the fourth base block (10) and also has a main body (12a) formed integrally therewith at the same level as that of the fourth base block (10).

In the above description, the pressure reducing valve (the first fluid control device) (2), the pressure indication device (the second fluid control device) (4) and the flow-rate adjustment device (the third fluid control device) (11) are treated as fluid control devices to be replaced with relatively-higher frequencies and, thus, are formed to be fluid control devices provided with the base blocks (3) (5) (9) (10). On the other hand, the on-off valves (6) (7) (12) are treated as fluid control devices to be replaced with relatively-lower frequencies and, thus, are formed to be fluid control devices provided with no base blocks.

A process-gas introducing joint (14) for supplying process gas to the pressure reducing valve (2) is connected to the first base block (3). A purge-gas introducing joint (15) for supplying purge gas to the second on-off valve (7) is connected to the main body (7a) of the second on-off valve (7). A purge-gas ejection joint (16) for ejecting the process gas and the purge gas from the third on-off valve (12) is connected to the main body (12a) of the third on-off valve (12).

In assembling the respective members (2) (3) (4) (5) (6) (7) (9) (10) (11) (12), male screw members (18) are used in the forward and rearward directions (in the direction connecting the inlet and the outlet, or the leftward and rightward directions in the figure) are used, in addition to male screw members (17) extending from above, and, further, the base blocks (3) (5) (9) (10) as the flow-channel blocks, the main bodies (6a) (7a) (12a) of the on-off valves (6) (7) (12), and the connection blocks (2a) (4a) (11a) (11b) of the fluid control devices (2) (4) (11) are butted with one another with sealing portions (sealing means) (20) interposed thereamong. The fluid flow channels formed within the base blocks (3) (5) (9) (10) and within the main bodies (6a) (7a) (12a) of the on-off valves (6) (7) (12) have basically an L shape which is opened upwardly at its one end and also is opened in one of the forward and rearward direction at its other end. At a total of five butting portions among the base blocks (3) (5) (9) (10) and the main bodies (6a) (7a) (12a) of the on-off valves (6) (7) (12), there are provided sealing portions (20).

The pressure reducing valve (2) and the pressure indication device (4) (the first and second fluid control devices) are communicated with the base blocks (3) (5) corresponding thereto, at fluid flow channels (23) (24) therein at two positions spaced apart from each other by a predetermined interval in the forward and rearward directions and, in association therewith, two sealing portions (20) are provided with a predetermined interval interposed therebetween in the forward and rearward directions, between the pressure reducing valve (2) and the pressure indication device (4) and the base blocks (3) (5).

In the aforementioned fluid control apparatus (1), the fluid control devices, such as the pressure reducing valve (2), the pressure indication device (4) and the flow-rate adjustment device (11), are coupled to the base blocks (3) (5) (9) (10) existing thereunder, through the male screw members (17) from above, so that the fluid control devices (2) (4) (11) can be extracted upwardly and individually, by detaching the male screw members (17). The on-off valves (6) (7) (12) are coupled, at their main bodies (6a) (7a) (12a) provided integrally therewith, to the base blocks (3) (5) (9) (10), through the male screw members (18) in the forward and rearward directions, so that they can not be detached in the state where the fluid control devices (2) (4) (11) are mounted. As a result, when the on-off valves (6) (7) (12) are required to be individually replaced, it is necessary to disassemble the entire fluid control apparatus (1), which involves many burdensome processes. However, the on-off valves (6) (7) (12) are required to be subjected to maintenance with lower frequencies than those of the fluid control devices such as the pressure reducing valve (2), the pressure indication device (4) and the flow-rate adjustment device (11). Therefore, by performing maintenance checks of the on-off valves (6) (7) (12) at the same time as the maintenance checks of the fluid control devices (2) (4) (11), it is possible to substantially eliminate the necessity of performing further maintenance.

Thus, with the fluid control apparatus (1), it is possible to enable upwardly and individually extracting the fluid control devices (2) (4) (11) which are to be replaced with higher frequencies, thereby improving the ease of maintenance thereof, and, also, it is possible to avoid the use of the base blocks (3) (5) (9) (10) as separate members for the on-off valves (6) (7) (12), while substantially preventing the degradation of the ease of maintenance thereof, which reduces the number of members and facilitates assembling. Accordingly, with the entire fluid control apparatus (1), it is possible to attain both the ease of maintenance and the ease of assembling at higher levels than in the conventional art.

Figure 3:
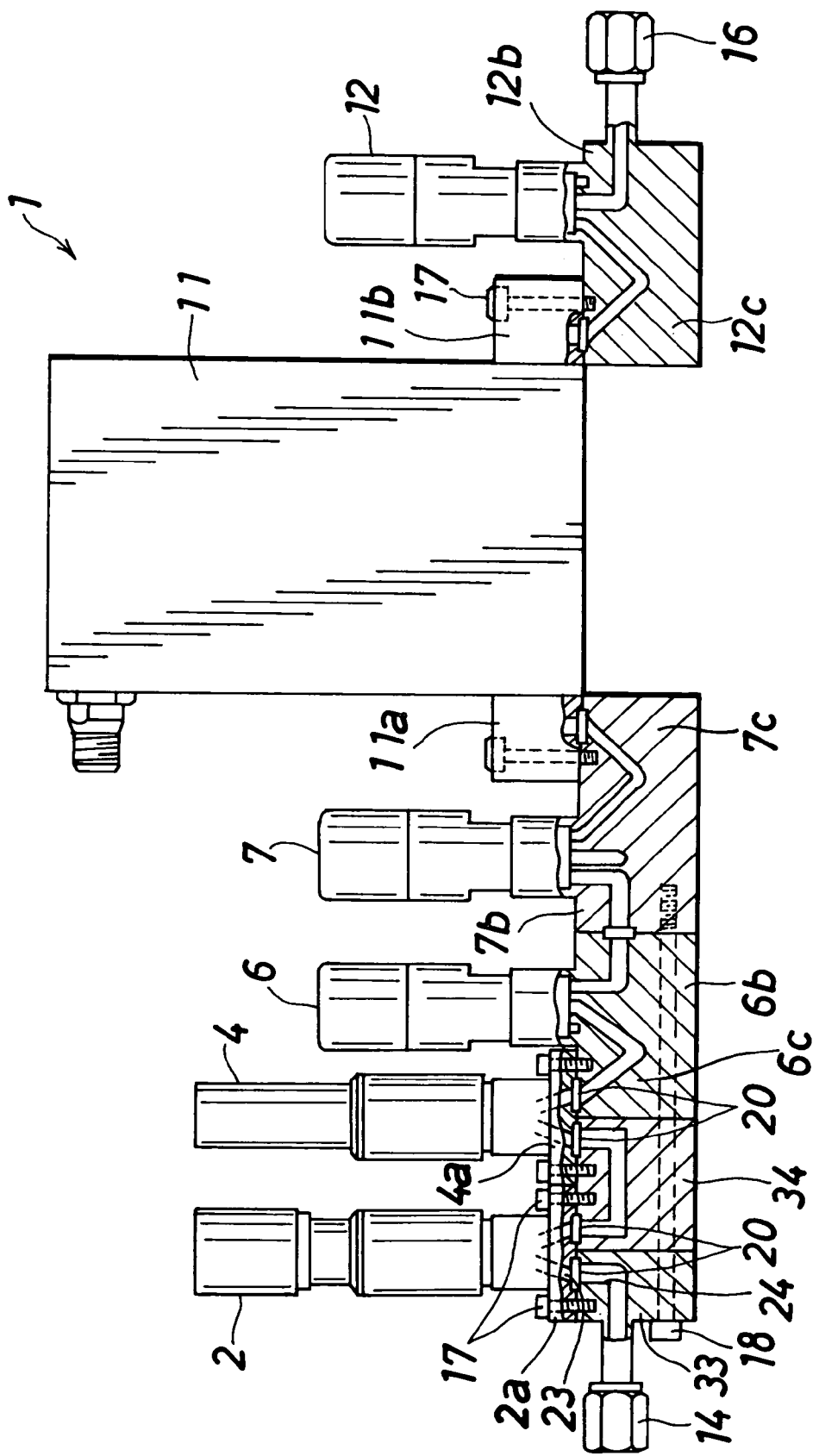
FIG. 3 is a vertical cross-sectional view showing a second embodiment of the fluid control apparatus according to the present invention.

FIG. 3 shows a portion of a fluid control apparatus according to a second embodiment of the present invention.

The fluid control apparatus (1) includes a pressure reducing valve (a first fluid control device) (2) having a connection block portion (2a) at its lower end, a first base block (33) which supports a half portion (the left-half portion in the figure) of the pressure reducing valve (2), a pressure indication device (a second fluid control device) (4) which is placed adjacent to the outlet side (the right side in the figure) of the pressure reducing valve (2) and has a connection block portion (4a) at its lower end, a second base block (34) which supports the pressure reducing valve (2) at its one-half portion (the left-half portion in the figure) and also supports the pressure indication device (4) at the other half portion (the right-half portion in the figure), a first on-off valve (6) which is placed adjacent to the outlet side of the pressure indication device (5) and has, at its lower portion, a main body (6b) formed integrally therewith at the same level as that of the base blocks (33) (34) such that a leftward-protruding block portion (6c) of the main body (6b) supports the right-half portion of the pressure indication device (4), a second on-off valve (7) which is placed adjacent to the outlet side of the first on-off valve (6) and has a main body (7b) formed integrally therewith at the same level as that of the main body (6b) of the first on-off valve (6) such that a rightward-protruding block portion (7c) of the main body (7b) supports an inlet-side connection block portion (11a) of a flow-rate adjustment device (11), the flow-rate adjustment device (a third fluid control device) (11) supported such that it straddles the main bodies (7b) (12b) of the second and third on-off valves (7) (12), and a third on-off valve (12) which is placed adjacent to the outlet side of the flow-rate adjustment device (11) and has, at its lower portion, a main body (12b) formed integrally therewith at the same level as that of the base blocks (33) (34) such that a leftward-protruding block portion (12c) of the main body (12b) supports the flow-rate adjustment device (11).

In the present embodiment, the actuator portions of the respective fluid control devices (2) (4) (11) and the respective on-off valves (6) (7) (12) are formed to be the same as those of the first embodiment, but the base blocks (33) (34) and the main bodies (6b) (7b) (12b) of the on-off valves (6) (7) (12) are changed.

In comparison of the present embodiment with the first embodiment shown in FIG. 1, the main bodies (6b) (7b) (12b) of the on-off valves (6) (7) (12) are provided with protruding block portions (6c) (7c) (12c), and the leftward-protruding block portion (6c) of the first on-off valve (6) supports the right-half portion of the pressure indication device (4), the rightward-protruding block portion (7c) of the second on-off valve (7) supports the inlet-side connection block portion (11a) of the flow-rate adjustment device (11), and the leftward-protruding block portion (12b) of the third on-off valve (12) supports the outlet-side connection block portion (11b) of the flow-rate adjustment device (11), respectively. Further, while, in the first embodiment, the flow channels basically have an L shape, the fluid flow channel formed in the second base block (34) has an U shape with two upward openings, and the main bodies (6b) (7b) (12b) of the respective on-off valves (6) (7) (12) are each provided with a V-shaped flow channel with two upward openings and an L-shaped flow channel which is opened upwardly at its one end while being opened in the forward or rearward direction at its other end.

Thus, with the fluid control apparatus (1) according to the second embodiment, the third and fourth base blocks (9) (10) used for supporting the flow-rate adjustment device (11) in the first embodiment are eliminated, which reduces the number of base blocks (33) (34) from 4 to 2 and, also, reduces the number of sealing portions (20) used in the butting portions among the base blocks (33) (34) and the main bodies (6b) (7b) (12b) of the on-off valves (6) (7) (12) from 5 to 1.

Thus, with the fluid control apparatus (1) according to the second embodiment, similarly to that according to the first embodiment, it is possible to enable upwardly and individually extracting the fluid control devices (2) (4) (11) which are to be replaced with higher frequencies, thereby improving the ease of maintenance thereof, and, also, it is possible to avoid the use of the base blocks (33) (34) as separate members for the on-off valves (6) (7) (12) while substantially preventing the degradation of the ease of maintenance thereof, which reduces the number of members and facilitates assembling. Accordingly, with the entire fluid control apparatus (1), it is possible to attain both the ease of maintenance and the ease of assembling at higher levels than in the conventional art.

INDUSTRIAL APPLICABILITY

Since the present invention can reduce the number of members and can improve the assembling operation efficiency, the present invention can be applied to fluid control apparatuses for use in semiconductor manufacturing apparatuses and the like, thereby contributing to improvement of the performance of the semiconductor manufacturing apparatuses and the like.

The invention claimed is:

1. A fluid control apparatus comprising plural types of fluid control devices, base blocks for supporting the fluid control devices, and sealing means for ensuring sealing properties at the portions where fluid flow channels are butted with one another, wherein at least one of the plural types of fluid control devices is a fluid control device provided with a base block which includes a connection block portion provided with a flow channel opened at the lower surface and also is coupled to one or more base blocks placed thereunder through male screw members from above, the other fluid control devices, out of the plural types of fluid control devices, are fluid control devices provided with no base block which are closed at the lower surfaces of their main bodies and also are provided with no base blocks placed thereunder, and the fluid control device provided with the base block is coupled, at the base block placed thereunder, to the main bodies of the fluid control devices provided with no base block, through male screw members in the forward and rearward directions, such that their lower surfaces are flushed with each other, wherein the fluid control devices provided with no base block are on-off valves, and the fluid control device provided with the base block is any one of a pressure adjustment device, a filter, a pressure indication device and a flow-rate adjustment device, and wherein at least one fluid control device provided with the base block is mounted to only a single base block through male screw members from above, so that all of the fluid control device provided with the base block can be extracted upwardly and individually in a state where the fluid control devices provided with the base blocks are coupled, at the base blocks existing at the lower portion, to the main bodies of fluid control devices provided with no base block through male screw members in the forward and rearward directions, wherein at least one of the fluid control devices provided with no base block is provided, at its main body, with a protruding block portion for supporting a portion of the adjacent fluid control device provided with the base block.

\* \* \* \* \*